United States Patent [19]

Rescalli et al.

[11] 3,896,007
[45] July 22, 1975

[54] pH CONTROL OF RECYCLE WATER IN THE PLURAL STAGE DISTILLATION OF A CRUDE ACRYLONITRILE FEED

[75] Inventors: Carlo Rescalli; Pierluigi Rebora; Alessandro Ginnasi, all of San Donato Milanese, Italy

[73] Assignee: Snam Progetti S.p.A., Milan, Italy

[22] Filed: Nov. 10, 1972

[21] Appl. No.: 305,227

[30] Foreign Application Priority Data
Nov. 17, 1971 Italy................................ 31195/71

[52] U.S. Cl...................... 203/33; 203/35; 203/38; 203/85; 203/DIG. 3; 260/465.3; 260/465.9
[51] Int. Cl.............................................. B01d 3/34
[58] Field of Search ........ 260/465.3, 465.9; 203/33, 203/35, 37, 38, DIG. 3, 96, 83, 85

[56] References Cited
UNITED STATES PATENTS

| 2,793,227 | 5/1957 | Sadle................................ 260/465.9 |
| 2,807,573 | 9/1957 | Robertson............................ 203/33 |
| 2,836,614 | 5/1958 | Bewley.............................. 260/465.9 |
| 3,007,853 | 11/1961 | Patron et al...................... 260/465.9 |
| 3,155,601 | 11/1964 | Idol, Jr............................. 260/465.9 |
| 3,185,636 | 5/1965 | Stevens et al...................... 260/465.9 |
| 3,210,399 | 10/1965 | Krzemicki.......................... 260/465.9 |
| 3,257,445 | 6/1966 | Roelen et al....................... 260/465.9 |
| 3,264,197 | 8/1966 | Schonbeck et al. .................. 203/84 |
| 3,328,266 | 6/1967 | Modiano........................... 260/465.9 |
| 3,328,268 | 6/1967 | Borrel............................. 260/465.9 |
| 3,442,771 | 5/1969 | Jordan ............................. 203/33 |
| 3,459,639 | 8/1969 | Borrel et al....................... 260/465.9 |
| 3,535,849 | 10/1970 | Hausweiler et al. ................. 260/465.9 |
| 3,636,067 | 1/1972 | Lovett et al. ..................... 260/465.9 |
| 3,641,107 | 2/1972 | Breda.............................. 260/465.9 |
| 3,694,322 | 9/1972 | Ikeda et al....................... 203/DIG. 03 |

Primary Examiner—Norman Yudkoff
Assistant Examiner—Frank Sever
Attorney, Agent, or Firm—Ralph M. Watson, Esq.

[57] ABSTRACT

In a process for the plural stage recovery of acrylonitrile, comprising a first stage extractive distillation zone, a second stage rectification zone and a third stage stripping zone; an improvement which comprises, maintaining the contents of the first stage extractive distillation zone and the second stage rectification zone at a pH in the range of about 5.5 to 7.5.

4 Claims, 1 Drawing Figure

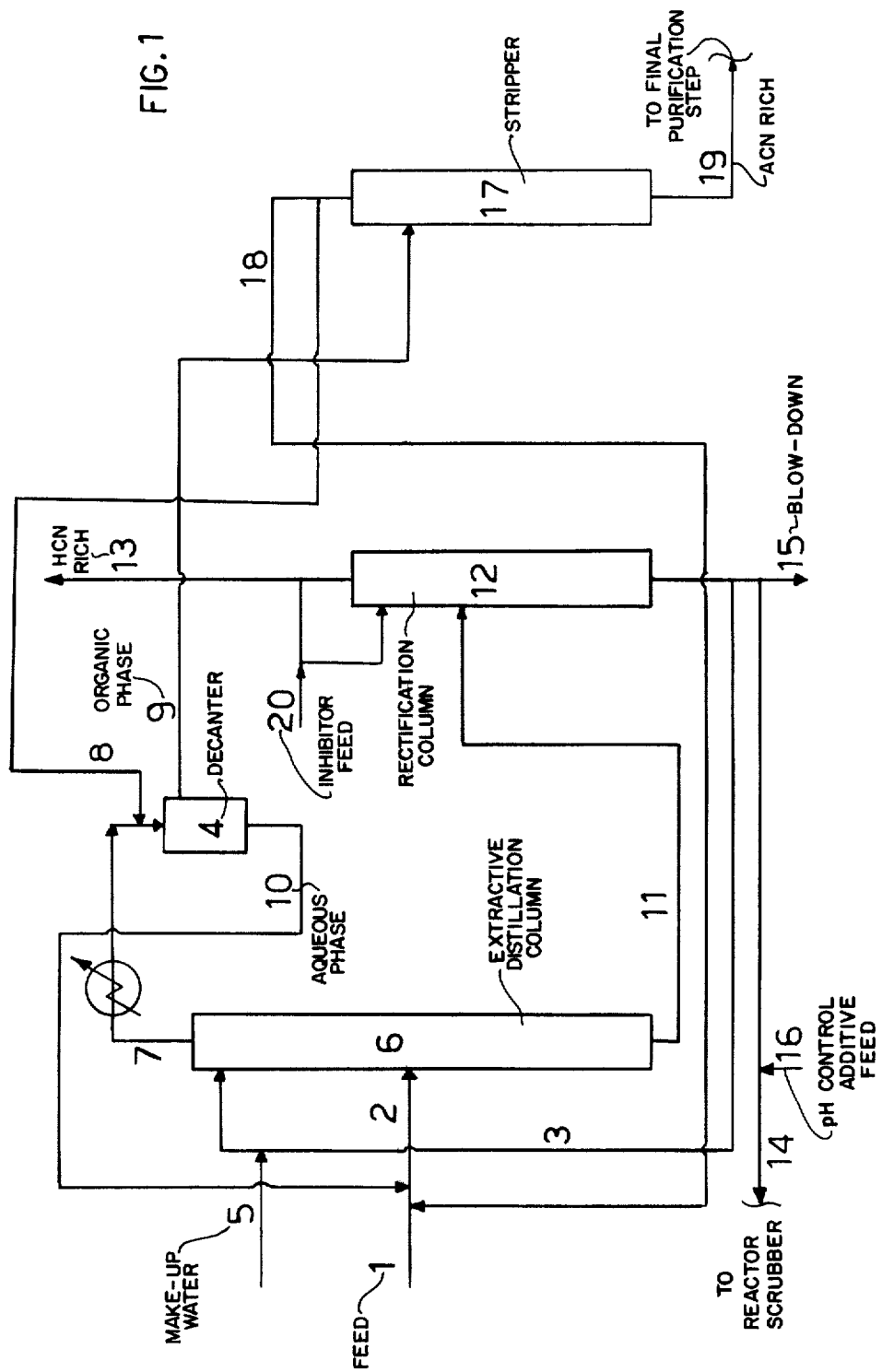

PH CONTROL OF RECYCLE WATER IN THE PLURAL STAGE DISTILLATION OF A CRUDE ACRYLONITRILE FEED

The present invention relates to a process for the purification of acrylonitrile.

More particularly, it relates to a process for the separation of acrylonitrile from hydrocyanic acid, compounds of carbonyl nature, acetonitrile and water.

In recent years the commercial interest for acrylonitrile has progressively increased owing to its increasing use in the field of synthetic fibers. Owing to the necessity of producing acrylonitrile in constantly increasing amounts and more economical conditions, new synthesis processes have been variations of the process based on the synthesis reaction between acetylene and hydrocyanic acid; among them the most important are presently the ones based on the ammoxidation of propylene.

Raw acrylonitrile (ACN) obtained by means of said processes contains in particular hydrocyanic acid (HCN), acetonitrile (ACEN) and carbonyl compounds (RCO) such as acetaldehyde, acetone, acrolein, propionaldehyde besides propionitrile, benzene and allyl alcohol.

The content of said substances in the final product must be reduced to very low limits (for instance, less than 5 p.p.m. both for the hydrocyanic acid and acrolein and less than 100 p.p.m. for carbonyl compounds considered all together); consequently the purification process used for the removal of said substances must be particularly effective.

At present all acrylonitrile purification processes are characterized by two distinct stages:

recovery of acrylonitrile produced in the ammoxidation reaction by absorbing the same in water.

purification of acrylonitrile recovered in the aforesaid stage.

The first stage is composed essentially of two steps: in the first step there is the removal of ammonia (by hot scrubbing the reaction gases with water generally acidified with sulphuric acid) while in the 2nd step all inert gases are removed (by cold scrubbing with water).

The so recovered acrylonitrile in aqueous solution is sent to purification (in the continuation of the description reference will be made only to said step) for removal of all reaction by-products formed and dissolved in the aforesaid second step; said by-products are essentially, as noted above, hydrocyanic acid, acetonitrile, carbonyl compounds, propionitrile, benzene, allyl alcohol and are present in a more or less remarkable amount according to the catalysts which have been used and to the working conditions of the ammoxidation reaction.

The purification is at present carried out according to various processes. One of them consists in: stripping the aqueous acrylonitrile solution to separate most of the water; feeding the stream containing organic compounds to a rectification column from the top of which HCN is removed; distilling by extractive distillation with water the fraction obtained from the bottom of the HCN removal stage, obtaining from the bottom acetonitrile and from the top the acrylonitrile containing fraction; distilling said last stream obtaining from the top the low-boiling fraction constituted by water and carbonyl compounds and from the bottom the acrylonitrile containing stream; rectifying said last stream separating from the bottom high boiling products (cyanohydrins, polymers and inhibitors) and from the top acrylonitrile.

A second process differs from the preceding one in that the HCN separation is effected after the extractive distillation for the separation of ACEN; from the top of the extractive distillation column a mixture of ACN and HCN free from ACEN is obtained; in a subsequent rectification HCN is removed from the top.

Another of the known processes comprises the following steps:

formation of cyanohydrins; removal of HCN by rectification of the aqueous solution of acrylonitrile; removal of the high boiling residues constituted by the previously formed cyanohydrins, polymers and inhibitors, extractive distillation with water for the acetonitrile separation; distillation to remove carbonyl compounds and water; final purification to obtain polymerization grade acrylonitrile.

It is to be noted that in the known art the separation of acetonitrile and HCN from acrylonitrile is carried out in two separate columns with a consequent increase of the plant cost and of its operation.

It has been surprisingly found that the separation of acetonitrile and HCN from acrylonitrile can be carried out in a single column obtaining acrylonitrile strictly within the specifications.

The subject of the present invention is a process for the separation of acrylonitrile from hydrocyanic acid, acetonitrile, carbonyl products cyanohydrins, nitriles having a higher number of carbon atoms than acrylonitrile, benzene, allyl alcohol, propionitrile and other compounds present in the aqueous acrylonitrile stream leaving the scrubbing column, in which process the number of columns is remarkably reduced and the working conditions are less severe than those of the prior art processes.

In particular the process which is the subject of the present invention, besides allowing the purification at lower costs, permits a more elastic and easy operation of the columns, insuring the production of acrylonitrile strictly within the specification as to hydrocyanic acid and carbonyl products more rigorously than in other processes previously known.

The purification method which is the subject of the present invention is comprised of the following steps:

a. separating HCN from ACN by extractive distillation with water; in said operation HCN is discharged from the column bottom together with water, while ACN is withdrawn from the top.

In particular the separation is carried out on the aqueous stream leaving the acrylonitrile absorption column and is effected in such a way that 30 – 90%, preferably 60% – 80% by weight, of fed HCN is discharged from the bottom, the ACN losses being completely negligible.

During the operation, ACEN present in the stream leaving the absorption column is separated from acrylonitrile and more precisely it is discharged from the bottom together with HCN.

b. separating from ACN, always in the aforesaid extractive distillation column, all carbonyl compounds present in the feed to the same.

In particular, by working with water having a pH in the range of from 5.5 to 7.5 under the conditions of point (a) suitable for the separation of HCN, the carbonyl products are discharged from the bottom in the form of cyanohydrins while raw acrylonitrile discharged from the column top proves to be strictly within the specification as to the aforesaid compounds.

This is feasible by a suitable pH control of the waters circulating in the purification cycle constituted by the absorption column, extractive distillation column and column for the recovery of the waters. The pH value for the cycle waters must be always higher than 5.5; on the other hand the use of water having a pH higher than 7.5 should be avoided owing to the possibility both of ACN and HCN polymerizations and of secondary reactions of other kinds which are in any case dangerous to the column operation.

The addition of the additive compound for maintaining the pH in the desired range can be effected at any point of the cycle.

As additives use is made of alkaline or alkaline earth metal salts as for instance, sodium or calcium carbonate, phosphate or acetate and acids such as acetic and phosphoric acids.

c. separating the saturation water contained in the raw ACN coming from the extractive distillation column by stripping under vacuum.

In particular the vapours leaving the column top are fed to a dephlegmator: the liquid stream leaving the same, constituted essentially by the acrylonitrile-water heteroazeotrope, is separated in two phases in order to recover acrylonitrile (which is fed again), while the gaseous stream leaving the same and containing all hydrocyanic acid present in the raw acrylonitrile leaving the extractive distillation column, is condensed and then recycled in said last column in order to allow the recovery and elimination respectively of ACN and HCN.

The stream leaving the bottom, constituted essentially of acrylonitrile, is fed to a last purification stage to eliminate the possible small quantities of formed polymerization products, the used inhibitors besides benzene, propionitrile, allyl alcohol and high boiling soluble organic compounds which are possibly present.

The advantages of the cycle which is the subject of the present invention in comparison with the purification processes previously known and described are evident.

In fact:

a. the separation of HCN by extractive distillation allows first of all the elimination of the HCN rectification column present in the prior art processes; moreover it offers higher guarantees of obtaining ACN according to specification as to ACEN; in fact the overhead product of the extractive distillation column before being contaminated with acetonitrile, almost the whole hold up of HCN in the lower section of the same column must be exhausted, said hold up being very high and higher than the sum of the hold up of all other present organic compounds;

b. the separation, as aforesaid, of carbonyl compounds in the extractive distillation column, and consequently the obtaining from the top of the same column of ACN within the specifications as to the aforesaid compounds, make to obvious economical advantages possible since there is both a remarkable simplification of a purification step (the separation of hydrocyanic acid and water from acrylonitrile is much more easily feasible than the separation of carbonyl compounds and water from the same acrylonitrile) and elimination of the possibility of formation of cyanohydrins in the steps following the extractive distillation with a subsequent guarantee of obtaining a final product within the specification as to carbonyl compounds and hydrocyanic acid.

The purification process which is the subject of the present invention will now be described in the accompanying drawing, which is to be considered as illustrative of the invention.

The aqueous solution (1) from which acrylonitrile must be recovered is fed through line 2 to the extractive distillation column 6 together with the recycle streams 10 and 18.

From the top a stream is discharged (completely free from acetonitrile, carbonyl products and containing about 30% of fed HCN), which stream, after condensation, through line 7 is sent to the separation tank 4; the organic phase, through line 9, is fed to the subsequent purification steps while the aqueous phase, through line 10 is fed again to the extractive distillation column.

From the bottom of said column an aqueous solution is discharged containing all acetonitrile, carbonyl products, about 70% of fed HCN and all remaining high boiling compounds formed during the reaction.

This stream, through line 11, is sent to the rectification column 12; ACEN, soluble high boiling organic compounds, practically all hydrocyanic acid and a part of the carbonyl products which have been fed, are discharged from the top through line 13, while all water necessary for absorbing ACN from the reaction gases (line 14) and as extractive solvent (line 3) is recovered from the bottom.

The bottom stream contains a small amount of the fed hydrocyanic acid and almost all carbonyl compounds in the form of cyanohydrins; they are removed by continuous discharge through 15 (the water eliminated in this way is restored through line 5). The additive compound for maintaining the pH in the water cycle at the desired value is fed through 16.

The raw acrylonitrile discharged from the extractive distillation column is fed to the stripping column 17: a stream 18 and a stream 8 are discharged from the column top, said streams containing all HCN and all water contained in the organic phase which has been produced by separation of stream 7; anhydrous acrylonitrile free from HCN is discharged (through line 19) from the column bottom, said acrylonitrile being sent to the last purification stage (not shown in the FIGURE) for the elimination of the possible small amounts of formed polymerization products, of used inhibitors, benzene, propionitrile, allyl alcohol, and high boiling soluble organic compounds which are possibly present.

Stream 18 is recycled to the extractive distillation column for recovering ACN and separating HCN contained therein, while stream 8 is fed to the separation tank 4 for recovering ACN and separating water.

An example will now be given in order to illustrate in a better way the invention without limiting the same.

EXAMPLE

With reference to FIG. 1, 39.8 Kg/h of an aqueous solution containing

| 2010 g of ACN | (5.05% | by weight) |
| 227 g of ACEN | (0.57% | by weight) |
| 239 g of HCN | (0.60% | by weight) |
| 24 g of RCO | (0.60% | by weight) | were fed to the extractive distillation column 6, through line 1, and through 3 46,000 g of solvent (water) were also fed.

By working under the following conditions:
overhead pressure = 1.0 ata
plates = 80
Solvent concentration on the overhead plate: about 99% by moles
bottom temperature = 104°C from the top an acrylonitrile stream was obtained which stream, after phase separation in separator 4, was fed to the stripping column 17; the obtained raw acrylonitrile was within the specifications as to ACEN ( ≤ 0.005% by weight), carbonyl compounds ( ≤ 0.0005% by weight acrolein, ≤ 0.005 by weight acetone and ≤ 0.002% by weight acetaldehyde) and contained only 30% of HCN fed through line 2.

The aqueous stream discharged from the bottom and containing all carbonyl products, ACEN and 70% of fed hydrocyanic acid was sent to the rectification column 12 working under the following conditions:

| | | |
|---|---|---|
| overhead pressure | = | 1.0 ata |
| L/D | = | 10 |
| plates | = | 50 |
| overhead temperature | = | 65°C |
| bottom temperature | = | 105°C |

100 g/h of an aqueous solution of $CH_3COOH$ at 1% were fed, as polymerization inhibitor, to the top of column 12 through 20.

From the top was discharged

| | | |
|---|---|---|
| ACN | = | 10.5 g/h |
| ACEN | = | 227.0 g/h |
| HCN | = | 230.0 g/h |
| RCO | = | 5.0 g/h |
| Water | = | 383.0 g/h |

3300 g/h were discharged from the bottom and more precisely through line 15 while, through line 3 and 14, 46.0 and 37.2 kg/h of water were recycled respectively to column 6 and to the absorption column through lines 3 and 14.

3.0 kg/h and 100 g/h respectively of deionized water and of a $Na_2CO_3$ solution at 1.5% by weight in water were fed respectively through 5 and 16; in this way the pH reached in the water cycle was 6.5.

The raw acrylonitrile discharged from phase separator 4 was fed to the upper portion of column 17 working under the following conditions.

| | | |
|---|---|---|
| overhead pressure | = | 0.53 ata |
| plates | = | 30 |
| dephlegmator temperature | = | 40°C |

The liquid phase discharged from dephlegmator was recycled, through 8, to phase separator 4 in order to allow the ACN recovery and the water separation, while the gaseous phase leaving the dephlegmator was condensed and then recycled, through line 18, into column 6.

The stream leaving the bottom of stripper 17 was fed to a last purification stage and, besides negligible amounts of inhibitors, polymerization products, propionitrile, allyl alcohol, benzene, was constituted by

| | | |
|---|---|---|
| ACN | = | 1995.5 g/h |
| Water | = | 0.2 " |
| HCN | ≤ | 1 p.p.m. by weight. |

What we claim is:
1. In a cyclic process for removing impurities from a synthesized acrylonitrile mixture wherein said mixture is extractively distilled with water, the overhead stream containing raw acrylonitrile and the bottom stream containing substantially all of said impurities, the improvement which comprises the steps of:
 a. subjecting a mixture containing acrylonitrile and impurities selected from the group consisting of HCN, $CH_3CN$, carbonyl compounds, benzene, propionitrile, allyl alcohol and mixtures thereof to an extractive distillation step using water as the extracting solvent and collecting an overhead stream comprising predominately raw acrylonitrile and a bottom stream comprising the impurities recited above;
 b. subjecting said bottom stream from the extractive distillation to a distillation step whereby predominately HCN, $CH_3CN$ and carbonyl compounds are discharged overhead; and removing and recovering as a bottom stream all the water necessary for absorbing acrylonitrile from the reaction gases and as the extractive solvent for the extractive distillation column, introducing an additive compound to the water necessary for absorbing acrylonitrile for maintaining the pH in this water and separately adding make-up water to the recycled extractive solvent;
 c. separating said overhead stream from the extractive distillation comprising predominately raw acrylonitrile into an aqueous phase which is recycled to said extractive distillation step and an organic phase comprising raw acrylonitrile which is conveyed to stripping step (d);
 d. stripping the raw acrylonitrile from step (c) into an overhead phase comprising a gaseous water component which is condensed and recycled to said extractive distillation step and an HCN-containing aqueous component which is recycled to separation step (c), and a bottom organic phase comprising substantially pure acrylonitrile;
 whereby the contents of the extractive column and rectification column are maintained at a pH in the range 5.5 to 7.5 by the incorporation of additives.

2. The process of claim 1 wherein the impurities allyl alcohol, propionitrile and benzene are removed from the acrylonitrile by subjecting the substantially pure acrylonitrile from step (d) to an additional distillation step.

3. The process of claim 1 wherein the pH of the contents of the extractive column and rectification column are regulated by the addition of an alkali metal salt selected from the group consisting of sodium carbonate, sodium phosphate and sodium acetate or an alkaline earth metal salt selected from the group consisting of calcium carbonate, calcium phosphate and calcium acetate or an acid selected from the group consisting of acetic and phosphoric acid.

4. The process of claim 1 wherein the bottom fraction from the extractive distillation contains from 60% to 80% by weight of HCN of the original feed.

* * * * *